United States Patent
Potter et al.

(10) Patent No.: US 11,131,438 B2
(45) Date of Patent: Sep. 28, 2021

(54) IR ILLUMINATOR WITH SECONDARY FUNCTION

(71) Applicant: VALEO NORTH AMERICA, INC., Troy, MI (US)

(72) Inventors: Brant Potter, Seymour, IN (US); John Orisich, Seymour, IN (US)

(73) Assignee: Valeo North America, Inc., Troy, MI (US)

(*) Notice: Subject to any disclaimer, the term of this patent is extended or adjusted under 35 U.S.C. 154(b) by 248 days.

(21) Appl. No.: 16/225,924

(22) Filed: Dec. 19, 2018

(65) Prior Publication Data

US 2020/0200356 A1 Jun. 25, 2020

(51) Int. Cl.
| | |
|---|---|
| *F21S 43/241* | (2018.01) |
| *B60Q 1/50* | (2006.01) |
| *B60Q 1/30* | (2006.01) |
| *B60Q 1/28* | (2006.01) |
| *F21S 43/14* | (2018.01) |
| *G05D 1/02* | (2020.01) |
| *B60Q 1/00* | (2006.01) |
| *H04N 5/33* | (2006.01) |
| *F21Y 115/10* | (2016.01) |

(52) U.S. Cl.
CPC .......... *F21S 43/241* (2018.01); *B60Q 1/0011* (2013.01); *B60Q 1/28* (2013.01); *B60Q 1/30* (2013.01); *B60Q 1/50* (2013.01); *F21S 43/14* (2018.01); *G05D 1/0242* (2013.01); *F21Y 2115/10* (2016.08); *H04N 5/33* (2013.01)

(58) Field of Classification Search
CPC ....... F21S 43/241; F21S 43/14; B60Q 1/0011; B60Q 1/28; B60Q 1/30; B60Q 1/50; G05D 1/0242

USPC ......................................................... 362/511
See application file for complete search history.

(56) References Cited

U.S. PATENT DOCUMENTS

| | | |
|---|---|---|
| 6,642,955 B1 | 11/2003 | Midgley et al. |
| 7,217,020 B2 | 5/2007 | Finch |
| 7,804,251 B2 | 9/2010 | Wang |
| 8,408,821 B2 | 4/2013 | Wu et al. |
| 8,816,306 B2 | 8/2014 | Yano, Jr. et al. |
| 2002/0071275 A1* | 6/2002 | Worgan ................ H05K 5/0017 362/247 |
| 2009/0200496 A1 | 8/2009 | Barrie et al. |
| 2012/0081902 A1* | 4/2012 | Tessnow ............... F21S 41/143 362/283 |
| 2013/0026504 A1* | 1/2013 | Marx ..................... F21S 41/19 257/88 |
| 2013/0155705 A1 | 6/2013 | Peck et al. |

(Continued)

*Primary Examiner* — Bryon T Gyllstrom
(74) *Attorney, Agent, or Firm* — Valeo North America, Inc.

(57) ABSTRACT

An IR illuminator used during the operation of autonomous vehicles, which provides improvement in the performance of cameras used in the vehicle at night time. An optical design of an outer lens of the IR illuminator is selected so that the outer lens forms a beam pattern for the output light from the IR light source, and also acts as a light guide for light emitted from a secondary visible light source, which is located in the same module as the IR light source, and which may be positioned on the same or a different printed circuit board as the IR light source. The material of outer lens is opalescent including scattering bodies. The optical design of the outer lens allows for improved field of view of the IR illuminator.

16 Claims, 10 Drawing Sheets

(56) References Cited

U.S. PATENT DOCUMENTS

| | | | |
|---|---|---|---|
| 2014/0286031 A1* | 9/2014 | Marcori | F21S 41/24 362/511 |
| 2018/0092180 A1* | 3/2018 | Godbillon | F21S 43/19 |
| 2018/0363872 A1* | 12/2018 | Jo | F21S 41/33 |
| 2020/0041094 A1* | 2/2020 | Godbillon | F21S 43/14 |

* cited by examiner

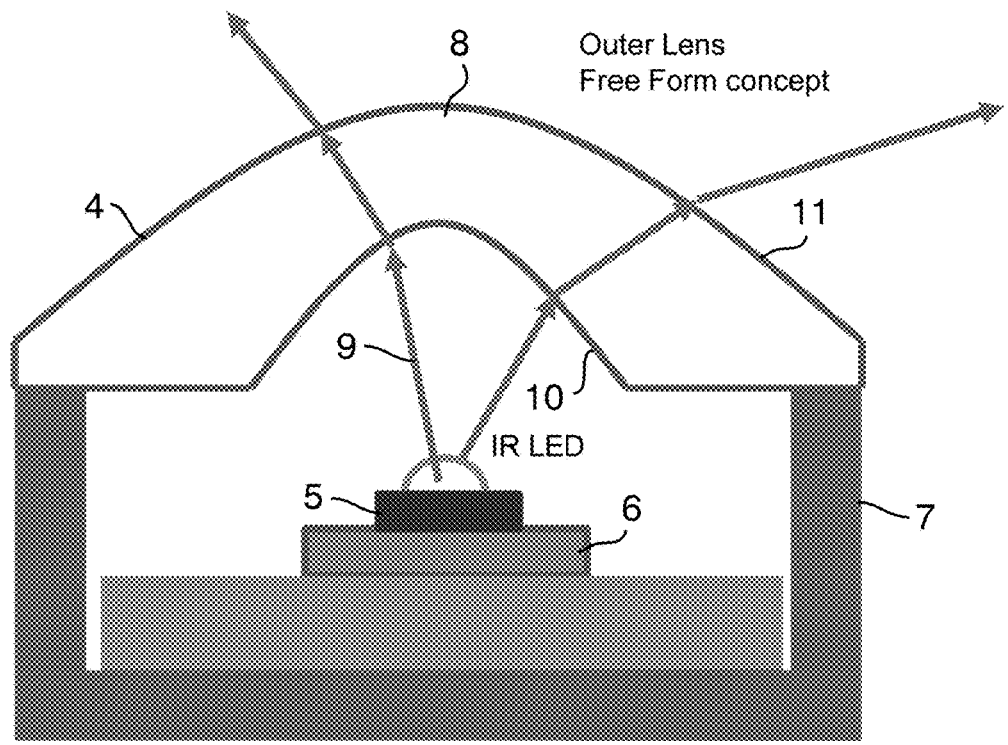
FIG. 3
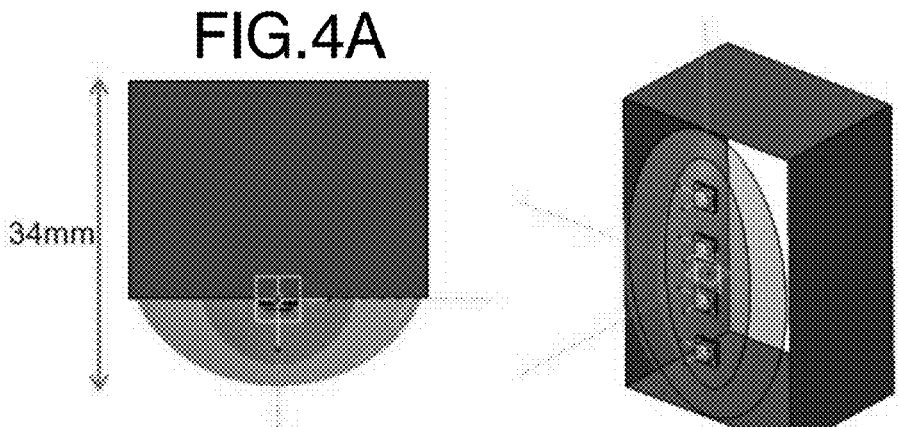
FIG. 4A
FIG. 4C
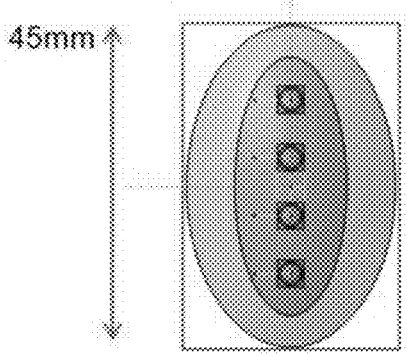
FIG. 4B

IR ILLUMINATOR WITH SECONDARY FUNCTION

BACKGROUND

Technical Field

The present application relates to a lightning module for a motor vehicle, notably an autonomous motor vehicle. The lightning module has a dual function, providing infrared (IR) illumination for the vehicle to assist the operation of a camera and also providing a secondary lighting function for providing visible illumination to assist various signaling functions for the vehicle.

Description of the Related Art

Current Autonomous Vehicles (AV) employ a plurality of sensor systems, including camera systems. The camera systems often use IR illuminators to increase the camera performance during nighttime. FIG. 1 shows typical zones around an AV vehicle which are monitored by vision cameras, and other sensors, for various functions. For example, vision cameras 105, 107, 109 may be used for traffic sign recognition, lane departure warning, digital side mirror, surround view, rear view mirror, or park assistance. In addition, other sensor systems are used for other functions. Long-range radar may be used for adaptive cruise control; LIDAR 103 may be used for surround sensing, emergency braking, pedestrian detection, or collision avoidance; short/medium-range radar may be used for cross traffic alert, blind spot detection or rear collision warning; and ultrasound/ultra-short-range radar may be used park assistance.

In addition, AVs, as well as other conventional vehicles, employ lighting modules emitting visible light that perform a variety of operations needed for the safe operation of the vehicle, such as side marking, warning, etc. For example, side marker lamps enable a driver of another vehicle to see an approaching vehicle, for example, at an angle at night, and take necessary measures in response.

Current IR illuminators typically include an IR light emitting diode (LED) and an outer lens which has no refractive optical power. For example, FIG. 2A shows a conventional IR illuminator comprising an IR LED 1, and a neutral flat cover lens 2 that receives the light rays 3 emitted by the IR LED 1 and emits the incident light rays without refraction to the exterior of the IR illuminator. The half-angle emission of the emitted light rays is typically in the 45° to 70° range. The FOV depends on the LED distribution, and type of LED selected. The lens 2 is typically made of polycarbonate (PC) or poly(methyl methacrylate) (PMMA) material. PC is used typically for exterior use of the IR illuminator. In addition, lens 2 may be clear or include additives to make the appearance of the lens black, see FIG. 2B. However, lens 2 allows IR radiation to pass ("IR black" lens).

It is desirable to incorporate in the lighting operation of an AV, both the IR illumination needed for the more efficient operation of the camera and the visible illumination needed for performing various secondary functions. This would allow better integration of the AV lighting functions and systems and also provide space savings for more efficient distribution of the various lighting components of the AV, by integrating visible lighting functions and IR illuminations for the camera in the same module.

Thus, a lighting module for an AV is needed that adds additional functionality and value to a conventional IR illuminator.

SUMMARY

A feature of the present application relates to a lighting module that is used during the operation of AVs to provide improvement in the performance of cameras used in the vehicle at night time.

In one non-limiting embodiment, an optical design of an outer lens of an IR illuminator of the lighting module is selected so that the outer lens forms a beam pattern for the output light from an IR light source, and also acts as a light guide for light emitted from a secondary visible light source, which is located in the same module as the IR light source, and which may be positioned on the same or a different printed circuit board (PCB) as the IR light source of the lighting module. The material of outer lens is opalescent including scattering bodies. The optical design of the outer lens allows for improved field of view (FOV) of the IR illuminator.

In a further non-limiting embodiment, the IR illuminator includes a feature of adding an additional component to the IR illuminator that guides light emitted by the IR light source.

In a further non-limiting embodiment, the IR illuminator includes a feature of the outer lens guiding radiation received by the IR illuminator to a detector inside the IR illuminator.

Preferentially, the IR light source of the IR illuminator includes a plurality of IR LEDs, and the secondary light source includes a plurality of visible LEDs, emitting light in the cyan, red, yellow wavelength ranges, as well as RGB LEDs.

Preferentially, light from the secondary light source is used to perform secondary functions during the operation of the AV, such as, indication of autonomous mode of operation of the vehicle, warning signaling, or side marking signaling.

Due to the optical design of the outer lens and the particular material of the outer lens, the IR illuminator of the present application forms a beam pattern for the IR light with improved FOV, and also acts as a light guide for visible light sources positioned in the same module as the IR light sources. In addition, due to the material of the outer lens, the outer lens can scatter the visible light to make the functional area to glow.

BRIEF DESCRIPTION OF THE DRAWINGS

The invention will be better understood in light of the description which is given in a non-limiting manner, accompanied by the attached drawings in which:

FIG. 3 is a schematic view of an IR illuminator using free form optical concept for increased FOV.

FIG. 4A, FIG. 4B and FIG. 4C are schematic views of an IR illuminator using free form optical concept for increased FOV with 4 IR LEDs with specifics of the LEDs and the outer lens.

DETAILED DESCRIPTION OF THE PREFERRED EMBODIMENTS

Figure 1:
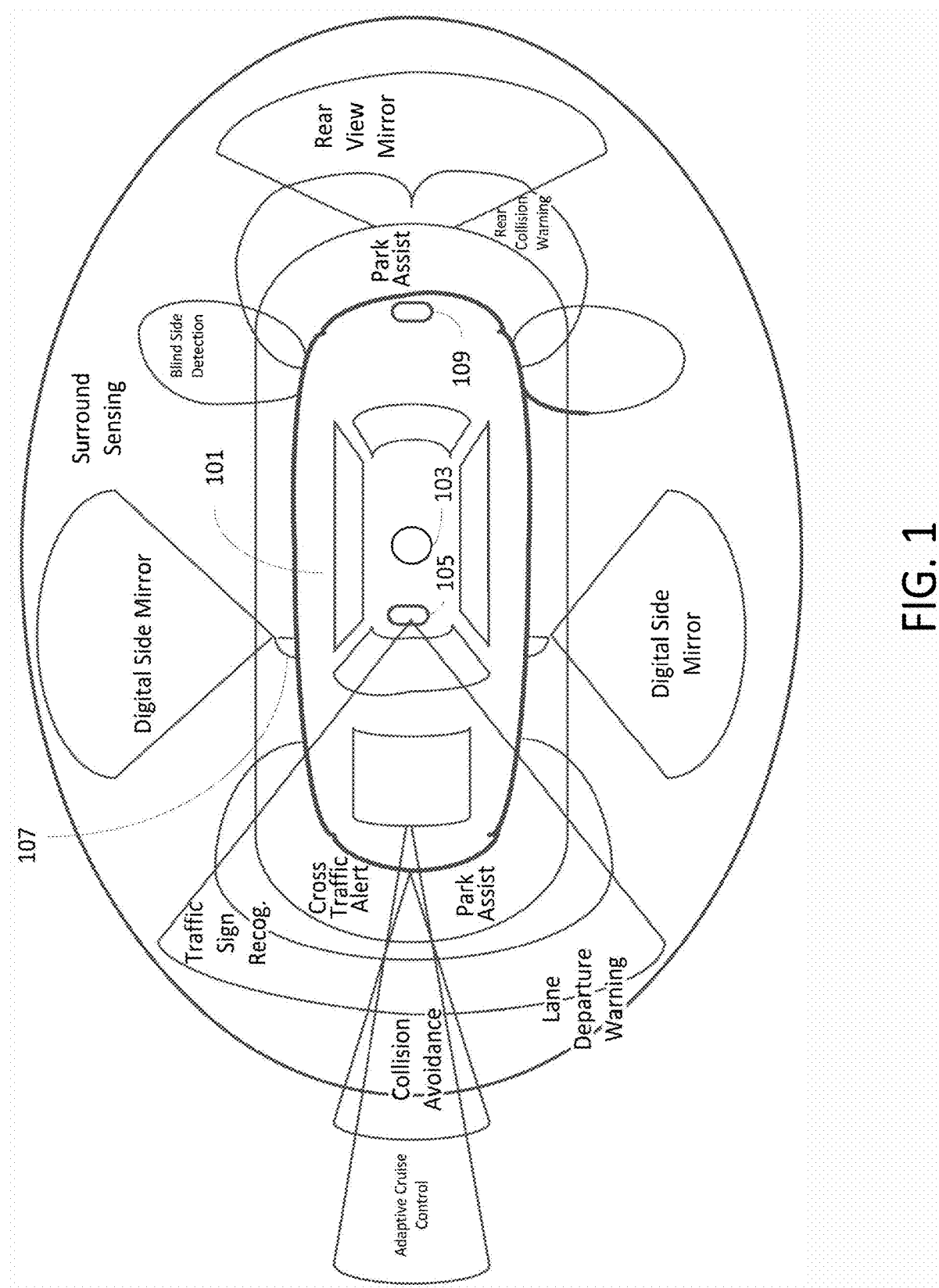
FIG. 1 is a schematic view of an AV illustrating the camera and other sensor-based sensing zones of the vehicle.
Figure 2A:
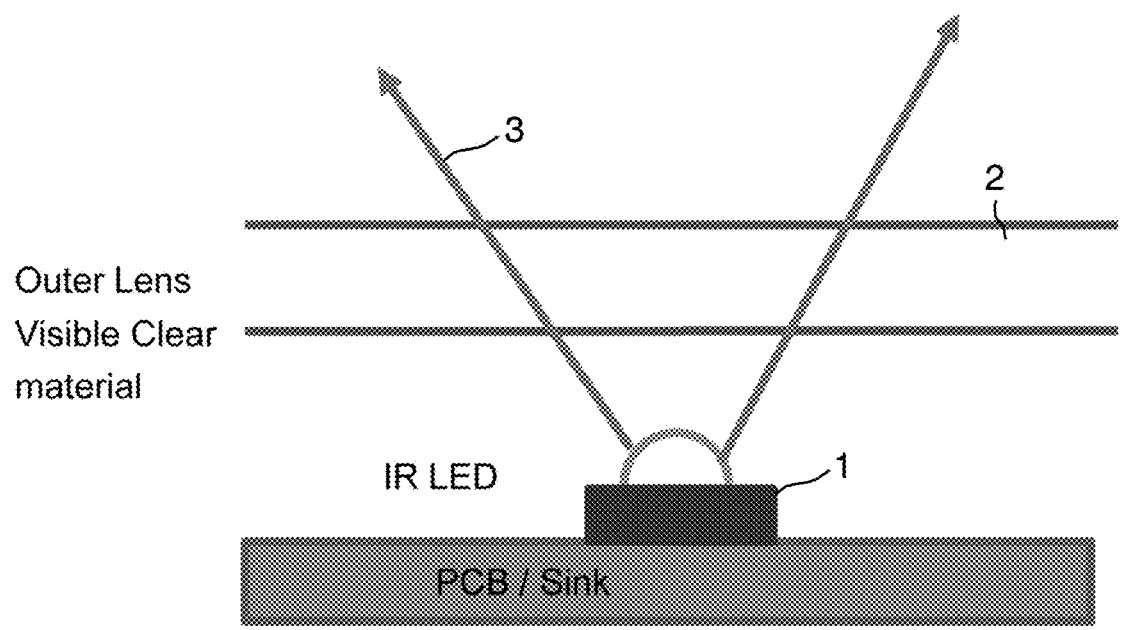
FIG. 2A is a schematic view of a conventional IR illuminator with a clear outer lens.
Figure 2B:
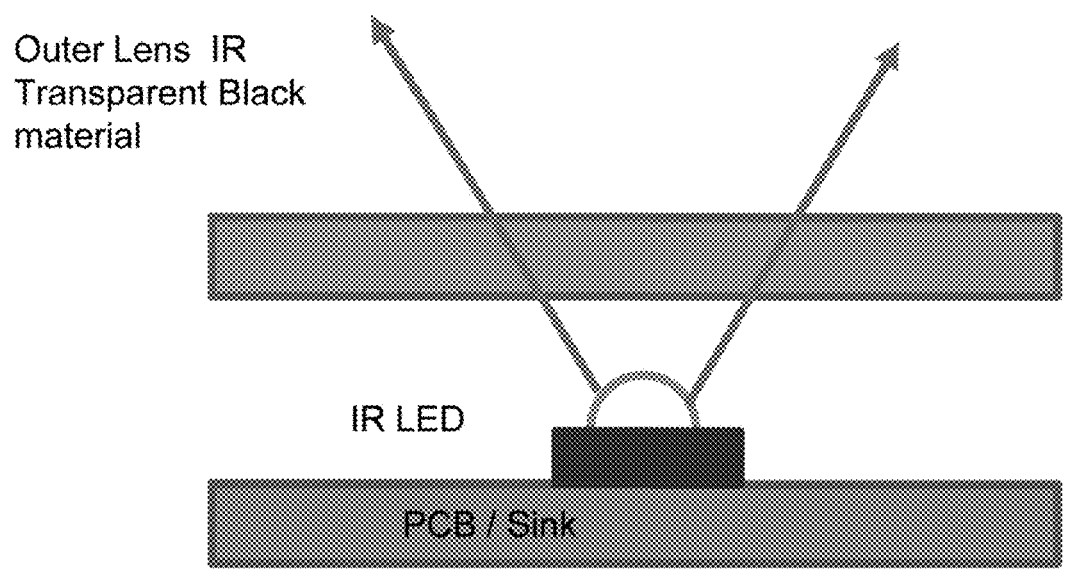
FIG. 2B is a schematic view of a conventional IR illuminator with a black, IR transparent, outer lens.

Referring to FIG. 3, a light module 4 comprises an IR LED 5 that is positioned on a PCB/Sink 6 inside a housing 7. An outer lens 8 covers one side of the housing 7. Light rays 9 emitted by IR LED 5 are incident on first surface 10 of lens 8, are refracted, travel through the body of lens 8, and exit the second surface 11. The first and second surfaces of lens 8 are designed to have a free form profile (not a sphere or ellipse) and are not offsets with constant thickness, creating optical power. The shape of the surfaces may also be optimized for light guiding.

It is desirable to increase the FOV of the IR illuminator emission pattern and to improve beam uniformity to improve the camera performance for the camera used together with the IR illuminator. The free form profile of the IR illuminator lens 8 allows for the FOV to increase from 140° to 180° (to match the FOV of the camera) and to improve uniformity over the FOV.

The above optical concept for the profile of the surfaces of the lens 8 can be used with different numbers of IR LEDs, e.g., 1, 2, 3, 4 . . . .

A 4-LED design is shown in FIG. 4 with information about the specifics of the LEDs and the outer lens.

Figure 5:
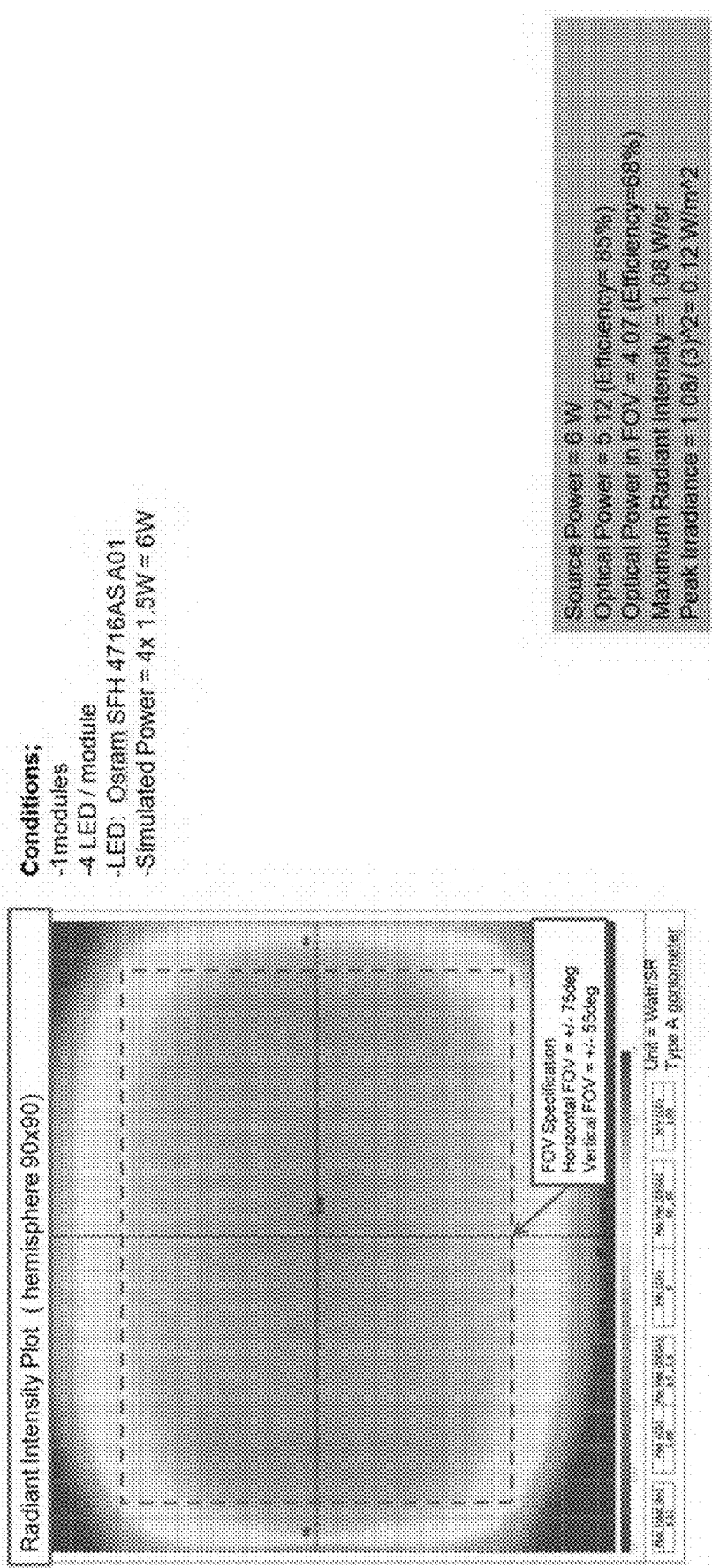
FIG. 5 shows graphs that show the improvement of FOV of the IR illuminator due to free form concept design over the conventional outer lens of a conventional IR illuminator.

FIG. 5 includes a graph showing the FOV improvement for the free form concept.

Figure 6:
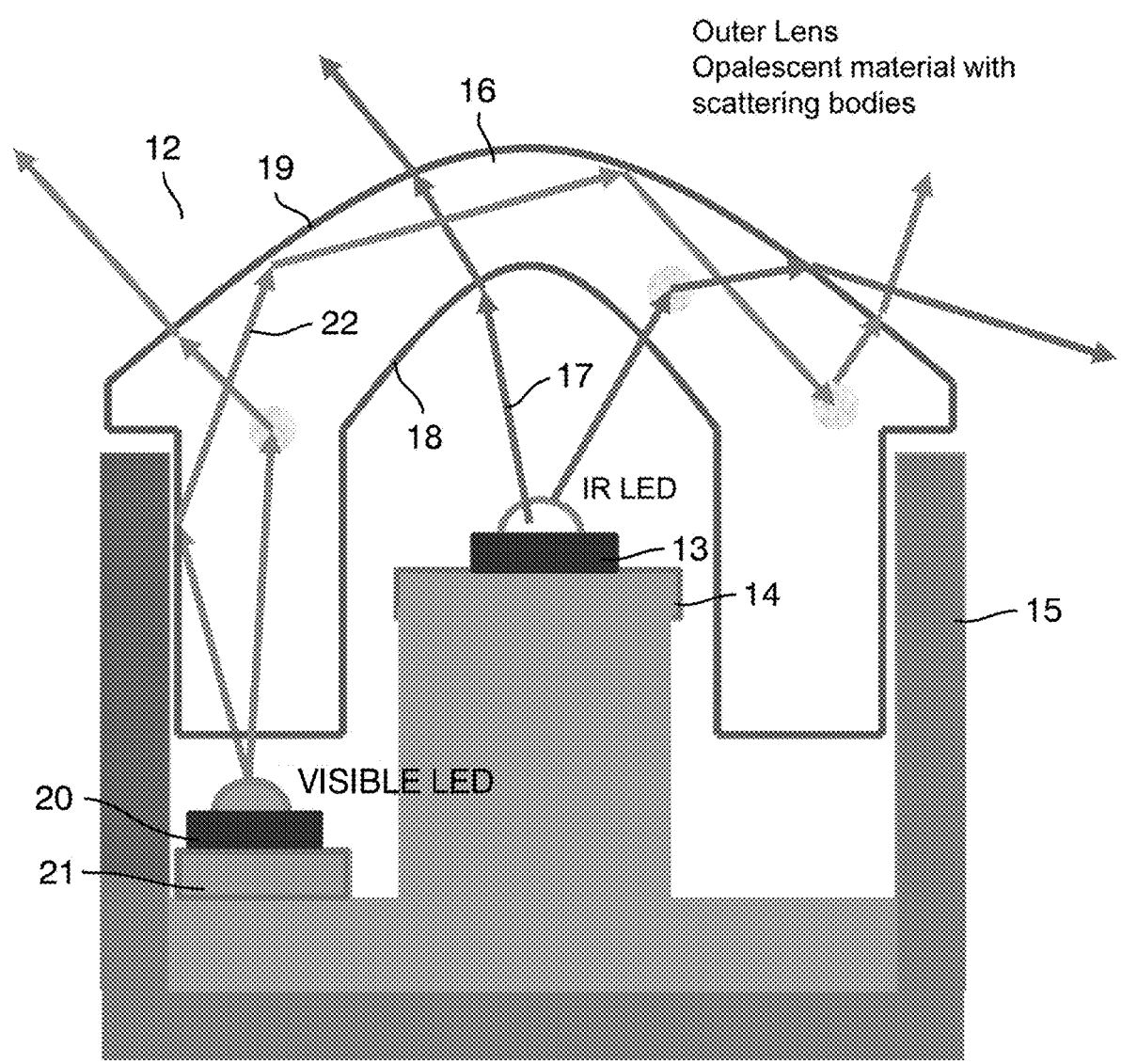
FIG. 6 is a schematic view of an embodiment of an IR illuminator using free form optical concept for increased FOV that provides secondary lighting function, the IR illuminator including an IR LED and a visible LED.

Referring now to FIG. 6, a light module 12 comprises an IR LED 13 that is positioned on a PCB/Sink 14 inside a housing 15. An outer lens 16 covers one side of the housing 15. Light rays 17 emitted by IR LED 13 are incident on first surface 18 of lens 16, are refracted, travel through the body of lens 16, and exit the second surface 19. The first and second surfaces of lens 16 are designed to have a free form profile.

It is desirable to have the IR illuminator serve a secondary lighting function using the same emitting surface. To achieve this, the free form concept can be enhanced by making the lens of an opalescent material (for example, Evonik Endlighten, or similar) that includes scattering bodies. The optical design may be modified to allow input from a second LED group, without negative impact on the IR performance. The characteristic shape of the free form first and second surfaces of the outer lens 16 allows for efficient light guiding of the secondary LED group.

A secondary light source comprising a visible LED 20 is positioned on a PCB 21 inside the housing 15. The outer lens 16 includes a secondary light guiding section, for example, on the left side, which receives light rays 22 emitted by the visible LED 20 and guides them into the main body of the lens 16. The light rays 22 exit the lens 16 through the second surface 19.

The secondary light source may include one or more visible LEDs. In non-limiting embodiments, the visible LEDs may be cyan, red, yellow, or RGB (red, green, blue), depending on the particular secondary lighting function desired.

For example, a list of possible secondary lighting functions with corresponding visible LEDs as secondary light sources for the IR illuminator includes:
Indication of autonomous mode vehicle operation (cyan LED)
Signature lighting (user controlled color, RGB LED)
Warning (red LED)
Side marking (yellow LED at the front of the car, red LED at the back of the car)

It is noted that for the IR illuminator with secondary function to be used for side marking, it will need to be positioned (along with the accompanying camera pod) on the car to meet side marker regulations.

Figures 7A, 7B:
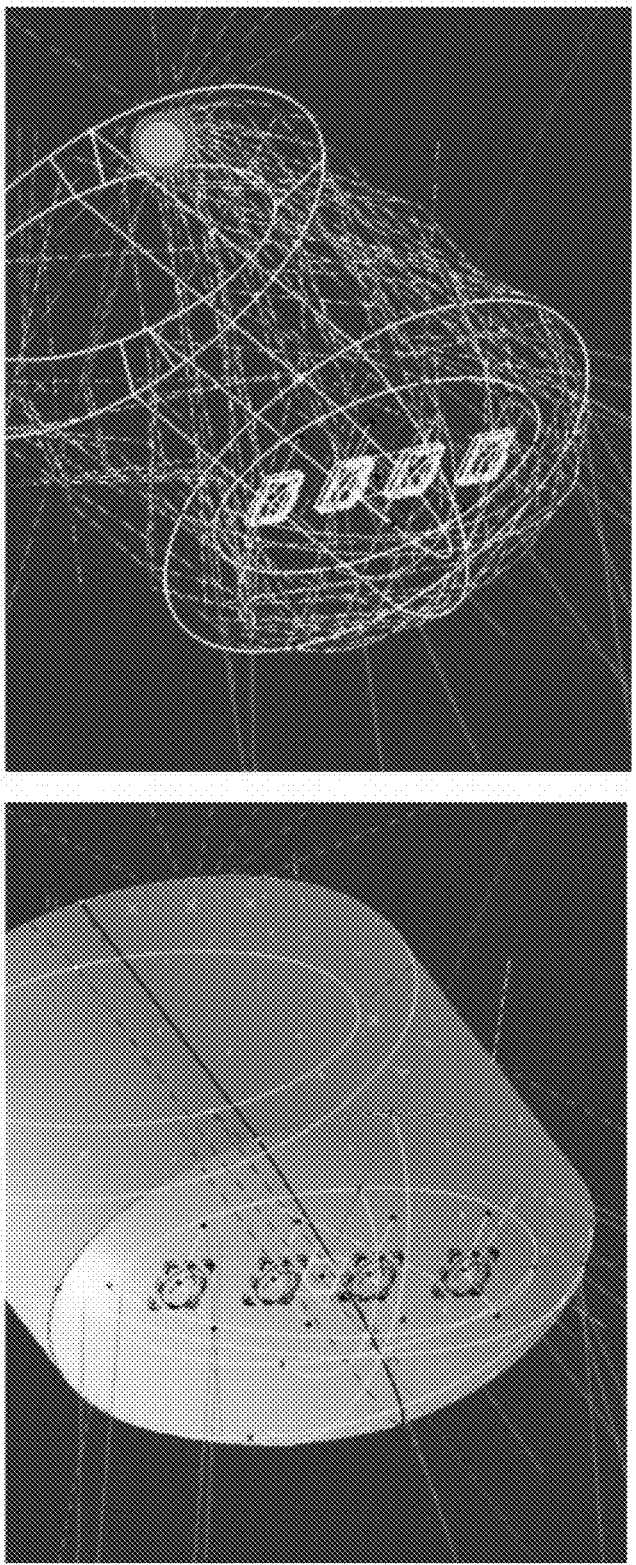
FIG. 7A and FIG. 7B show ray tracing graphs for light travelling inside the IR illuminator using free form optical concept with 4 IR LEDs.

FIG. 7A and FIG. 7B include ray tracing graphs that show that light from the secondary LEDs is sufficiently guided through the base and over the dome of the outer lens 16.

Figure 8:
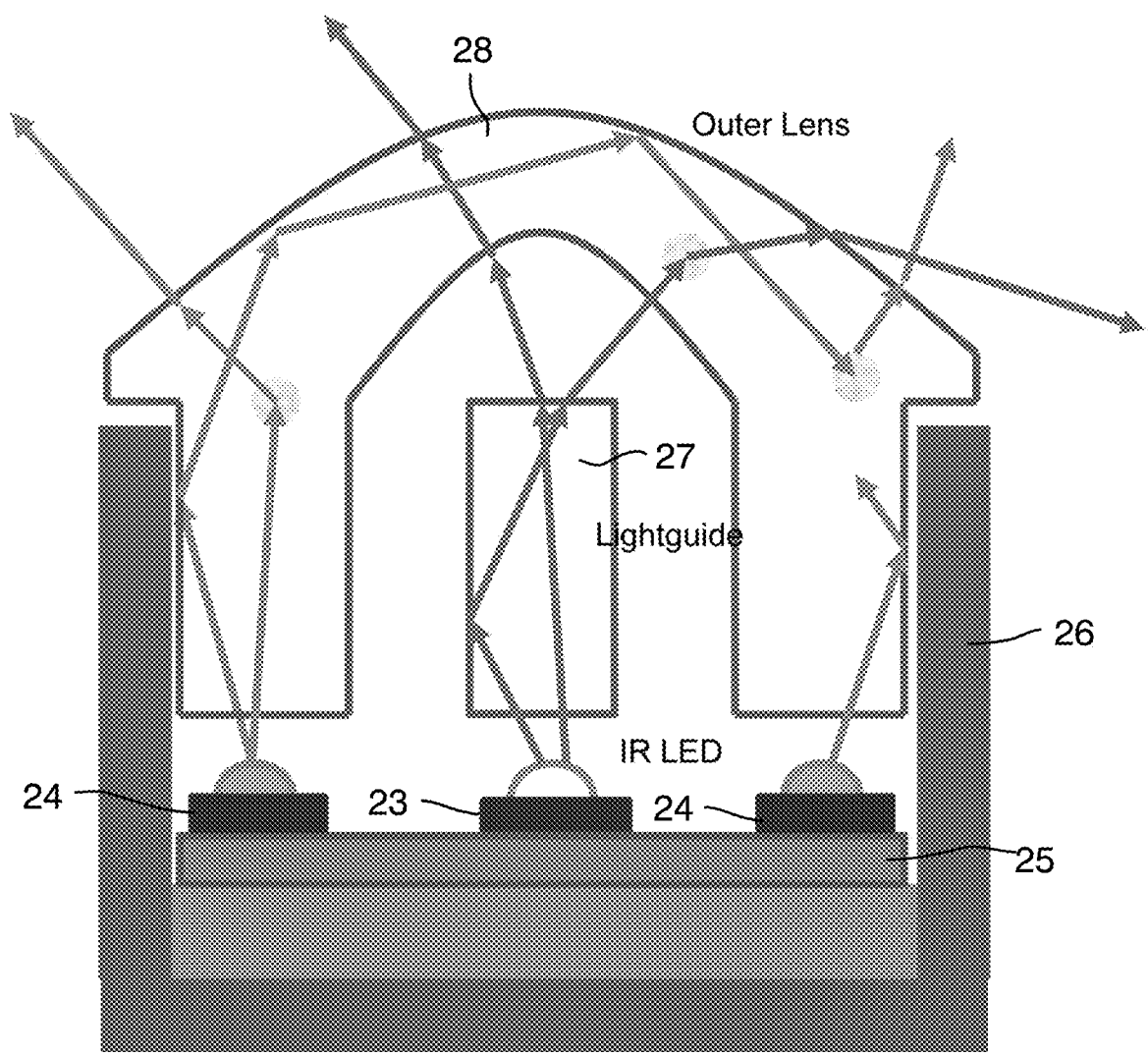
FIG. 8 is a schematic view of another embodiment of an IR illuminator using free form optical concept for increased FOV that provides secondary lighting function.

Referring to FIG. 8, another non-limiting embodiment is shown, where both the IR LED 23 and the secondary LEDs 24 are placed on the same PCB 25 inside the housing 26. In addition, an additional light guide 27, separate from the outer lens 28 having a free form profile, is positioned to receive light rays from the IR LED 23 and guide them towards the outer lens 28. The outer lens 28 also receives and guides light rays from the secondary visible LEDs 24.

Figure 9:
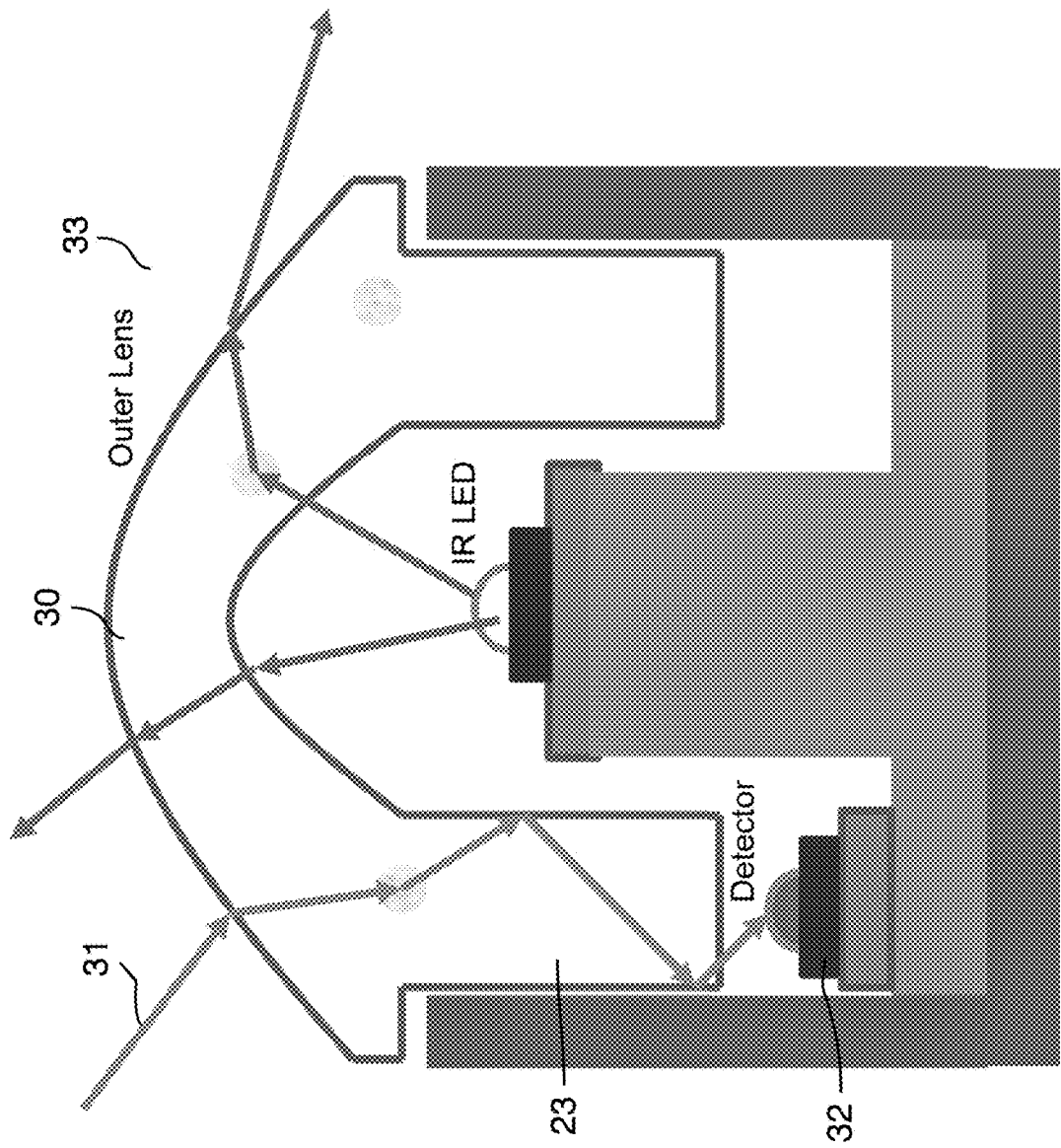
FIG. 9 is a schematic view of another embodiment of an IR illuminator using free form optical concept for increased FOV that provides secondary function.

In another non-limiting embodiment, shown in FIG. 9, the secondary, light guiding portion 29 of the outer lens 30 with the free form profile may be used to receive external light 31 and guide it towards a detector 32 inside the IR illuminator 33. The received light 31 may be ambient light or contain data. For example, the data may be data/software updates. A car may be parked at a charging station and while the car is charging, high speed data is transmitted from a base station to the car (the IR illuminator pod being on the outside of the vehicle). In addition, this embodiment may be used for car-to-car communications as well.

Figure 10:
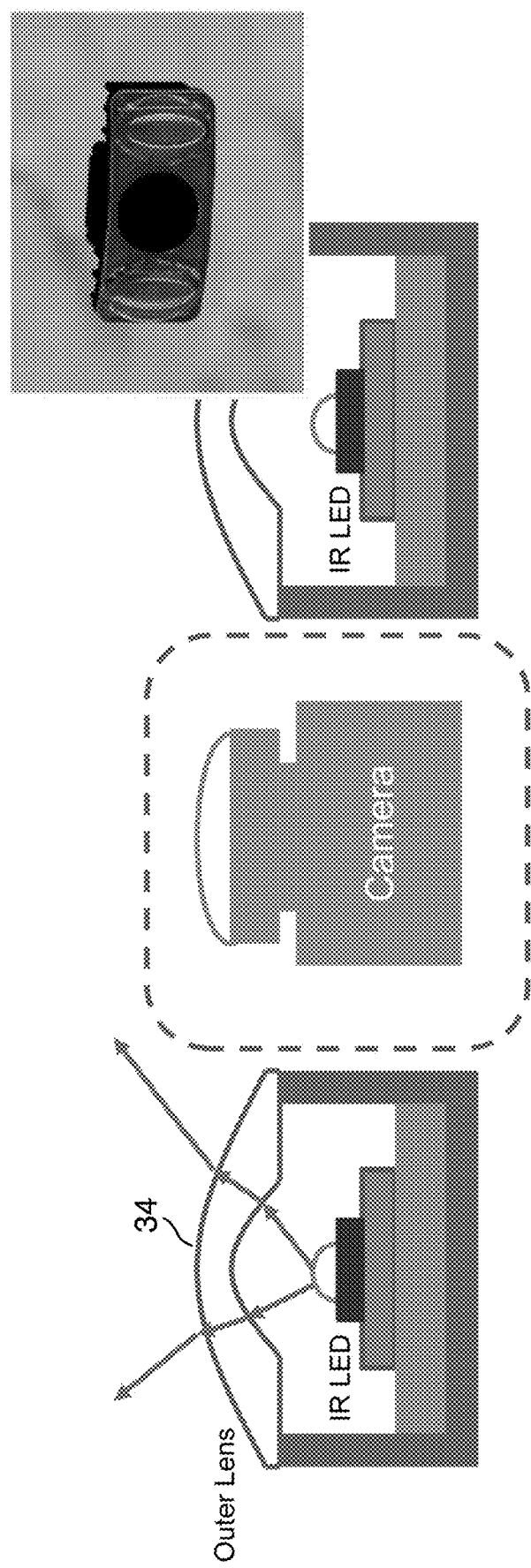
FIG. 10 is a schematic view of relative positioning between the IR illuminator and a camera in a camera pod.
Figure 11:
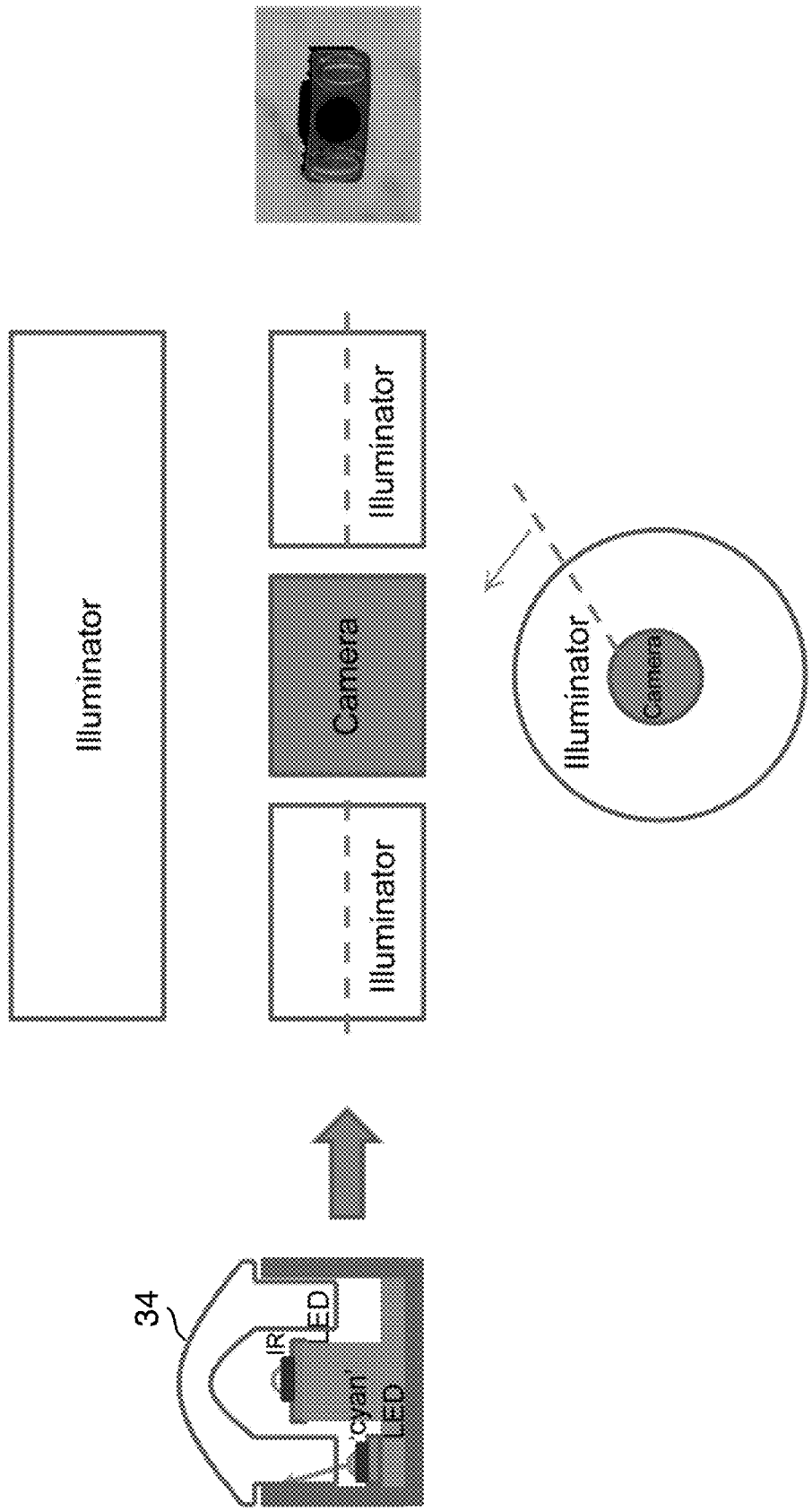
FIG. 11 is a schematic view of different possible relative positions between the IR illuminator and a camera in a camera pod.

The above discussed type of profile for the outer lens for the IR illuminator can be easily adapted to be extruded in linear fashion or in an arc relative to the camera. As shown in FIG. 10, the IR illuminator 34 can be placed in a pod linearly with respect to the camera, or it can be placed in an arc fashion to surround the camera (see middle of FIG. 11). The lens optical cross section 34 can be extruded in different ways to make rectangular lenses or round lenses for the corresponding positioning geometries.

The sensor system for the AV, that includes the IR illuminator described in the present application, comprises a central unit comprising at least one computer, for example, one or more microprocessors, for implementing the particular driving assistance method, for example, associating the received detector signals from the cameras, radars, LIDAR, etc. with corresponding outputs, e.g., images, sounds, etc., in order to assist in the driving operation of the AV. This central unit may be placed at any location of the motor vehicle, for example, may be integrated into the on-board computer of the motor vehicle. Alternatively, it may be placed within the camera pods. The sensor system further comprises communication means connecting the camera or the other sensors to the central unit, so that images from the cameras or other sensed data are received and processed by the central unit. The central unit further includes imaging processing software for the information necessary for driving assistance.

Numerous modifications and variations of the present disclosure are possible in light of the above teachings. It is therefore to be understood that within the scope of the appended claims, the described features may be practiced otherwise than as specifically described herein.

The invention claimed is:

1. An infrared (IR) illuminator device for a vehicle, comprising:
    a housing; a number of IR light emitting diodes (LEDs) positioned on a first printed circuit board (PCB) inside the housing to perform IR illumination for the vehicle; and
    an outer lens at one side of the housing having a first section comprising
        a first surface and a second surface, that covers the number of IR LEDs; so that light rays, emitted from the number of IR LEDs that are incident on the first surface, are refracted through a body and exit through the second surface;
    a light guide section that is separate from the outer lens, which guides light emitted from the number of IR LEDs to the first surface of the outer lens;
    wherein the outer lens is made of an opalescent material and includes light-scattering bodies therein, and the first and second surfaces of the outer lens have a free-form profile so that the field of view (FOV) of the emitted light is increased from 140 degrees to 180 degrees;
    wherein the outer lens comprises a second section which receives light from a secondary light source positioned on a second PCB inside the housing and guides a received light through the body of the outer lens to exit the second surface of the outer lens;
    wherein the second section receives light exterior to the IR illuminator device and guides the received light through the body of the outer lens to a sensor positioned on a third PCB,
    wherein the received exterior light includes high speed data transmitted to the vehicle or ambient light.

2. The IR illuminator device according to claim 1, wherein the secondary light source comprises a plurality of LEDs.

3. The IR illuminator device according to claim 2, wherein the plurality of LEDs emit light in the visible wavelength range.

4. The IR illuminator device according to claim 1, wherein the second PCB is the same as the first PCB.

5. The IR illuminator device according to claim 1, wherein the light emitted by the secondary light source is arranged to perform one of a plurality of secondary operations for the vehicle operation, including: indication of autonomous mode of operation of the vehicle, warning signaling or side marking signaling.

6. The IR illuminator device according to claim 5, wherein the secondary light source emits light in the cyan wavelength range or white light to indicate autonomous operation of the vehicle.

7. The IR illuminator device according to claim 5, wherein the secondary light source emits light in the red wavelength range to indicate rear side marking, tail marking, or stop signaling.

8. The IR illuminator device according to claim 5, wherein the secondary light source emits light in the yellow wavelength range to indicate front side marking.

9. The IR illuminator device according to claim 1, wherein four IR LEDs are positioned on the first PCB inside the housing.

10. The IR illuminator device according to claim 1, wherein the IR illumination due to the number of IR LEDs and secondary operations from the secondary light source are performed independently.

11. An Autonomous Vehicle (AV) comprising:
    a sensor system including a vision camera; and
    one or more infrared (IR) illuminator devices, the one or more IR Illuminator devices including: a housing, one or more IR light emitting diodes (LEDs) positioned on a first printed circuit board (PCB) inside the housing to perform IR illumination for the AV, and
    an outer lens at one side of the housing having a first section comprising
        a first surface and a second surface, and covering the one or more IR LEDs, so that light rays emitted from the one or more IR LEDs are incident on the first surface, the light rays are refracted through the body and exit through the second surface, wherein the outer lens is made of an opalescent material and includes a number of scattering bodies therein, and
    the first and second surfaces of the outer lens have a free form profile so that the field of view (FOV) of the emitted light is increased from 140 degrees to 180 degrees, the one or more IR illuminator devices being positioned relative to the vision camera linearly or in an arcuate direction.

12. The AV according to claim 11, wherein the outer lens comprises a second section which receives light from a secondary light source positioned on a second PCB inside the housing and guides a received light through the body of the outer lens to exit the second surface of the outer lens.

13. The AV according to claim 12, the IR illuminator further comprising a light guide section separate from the outer lens that guides light emitted from the one or more IR LEDs to the first surface of the outer lens.

14. The AV according to claim 12, wherein the second section receives light exterior to the one or more IR illuminator devices and guides the received light through the body of the outer lens to a sensor positioned on a third PCB.

15. The AV according to claim 12, wherein the light emitted by the secondary light source is arranged to perform one of a plurality of secondary operations for the AV operation, including: indication of autonomous mode of operation of the AV, warning signaling or side marking signaling.

16. The AV according to claim 12, wherein the secondary light source comprises a plurality of visible LEDs.

* * * * *

UNITED STATES PATENT AND TRADEMARK OFFICE
CERTIFICATE OF CORRECTION

PATENT NO. : 11,131,438 B2
APPLICATION NO. : 16/225924
DATED : September 28, 2021
INVENTOR(S) : Brant Potter and John Orisich Page 1 of 1

It is certified that error appears in the above-identified patent and that said Letters Patent is hereby corrected as shown below:

In the Claims

In Column 5, Claim 1, paragraph 6, replace, ". . . free-form profile so that the field . . ." with -- . . . free-form profile so that a field . . . --

In Column 6, Claim 11, paragraph 5, replace, ". . . rays are refracted through the body . . ." with -- . . . rays are refracted through a body . . . --

In Column 6, Claim 11, paragraph 6, replace, ". . . profile so that the field of view . . ." with -- . . . profile so that a field of view . . . --

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*